US012658177B2

(12) United States Patent
Dong et al.

(10) Patent No.: US 12,658,177 B2
(45) Date of Patent: Jun. 16, 2026

(54) SPEECH PROCESSING METHOD AND APPARATUS, AND ELECTRONIC DEVICE

(71) Applicant: Beijing Youzhuju Network Technology Co., Ltd., Beijing (CN)

(72) Inventors: Linhao Dong, Beijing (CN); Meng Cai, Beijing (CN); Zejun Ma, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 545 days.

(21) Appl. No.: 18/249,031

(22) PCT Filed: Apr. 6, 2022

(86) PCT No.: PCT/CN2022/085397
§ 371 (c)(1),
(2) Date: Apr. 13, 2023

(87) PCT Pub. No.: WO2022/228067
PCT Pub. Date: Nov. 3, 2022

(65) Prior Publication Data
US 2023/0402031 A1      Dec. 14, 2023

(30) Foreign Application Priority Data
Apr. 28, 2021      (CN) .......................... 202110470941.1

(51) Int. Cl.
*G10L 15/00*      (2013.01)
*G10L 15/02*      (2006.01)
(Continued)

(52) U.S. Cl.
CPC ............ *G10L 15/02* (2013.01); *G10L 15/063* (2013.01); *G10L 15/16* (2013.01); *G10L 15/22* (2013.01)

(58) Field of Classification Search
CPC ....... G10L 15/16; G10L 19/005; G10L 19/00; G10L 15/12; G10L 25/27; G10L 25/30;
(Continued)

(56) References Cited

U.S. PATENT DOCUMENTS 5,509,103 A      4/1996  Wang
9,230,541 B2 *      1/2016  Li ........................... G10L 15/08
(Continued)

FOREIGN PATENT DOCUMENTS

CN      108550364 A      9/2018
CN      109410924 A      3/2019
(Continued)

OTHER PUBLICATIONS

China National Intellectual Property Administration, International Search Report Issued in Application No. PCT/CN2022/085397, Jun. 20, 2022, WIPO, 7 pages.
(Continued)

*Primary Examiner* — Vu B Hang
(74) *Attorney, Agent, or Firm* — Alleman Hall LLP

(57) ABSTRACT

A speech processing method is provided. The method includes: receiving a speech block to be identified as a current speech block, where the speech block includes a past frame, a current frame and a future frame; performing a speech identification process based on the current speech block, where the speech identification process includes: performing speech identification based on the current speech block to obtain a speech identification result of the current frame and a speech identification result of the future frame; determining whether a previous speech block for the current speech block exists; in a case that the previous speech block for the current speech block exists, updating a target identification result based on the speech identification result of the current frame of the current speech block; and outputting
(Continued)

the speech identification result of the future frame of the current speech block.

20 Claims, 6 Drawing Sheets

(51) Int. Cl.
*G10L 15/06* (2013.01)
*G10L 15/16* (2006.01)
*G10L 15/22* (2006.01)

(58) Field of Classification Search
CPC ....... G10L 15/02; G10L 15/063; G10L 15/07; G10L 15/22; G10L 15/26; G10L 15/30; G10L 15/14; G10L 15/1815; G10L 15/197; G10L 15/1822; G10L 15/183; G10L 15/193; G10L 15/19; G10L 15/08

See application file for complete search history.

(56) References Cited

U.S. PATENT DOCUMENTS

| | | |
|---|---|---|
| 2007/0198266 A1 | 8/2007 | Li et al. |
| 2010/0298959 A1 | 11/2010 | Sekiguchi |
| 2018/0254039 A1 | 9/2018 | Qian et al. |
| 2018/0277143 A1* | 9/2018 | Song ...................... G10L 15/16 |
| 2021/0074264 A1 | 3/2021 | Liang et al. |

FOREIGN PATENT DOCUMENTS

| | | |
|---|---|---|
| CN | 110634469 A | 12/2019 |
| CN | 110895935 A | 3/2020 |
| CN | 111415667 A | 7/2020 |
| CN | 112562648 A | 3/2021 |
| CN | 114038465 A | 2/2022 |
| CN | 114038465 B | 8/2022 |
| CN | 114067800 B | 7/2023 |
| JP | 2019159058 A | 9/2019 |
| SG | 11202001627X | 3/2020 |

OTHER PUBLICATIONS

China National Intellectual Property Administration, Notice of Grant Issued in Application No. 202110470941.1, Jul. 18, 2022, WIPO, 4 pages.

International Preliminary Report on Patentability for International Application No. PCT/CN2022/085397, mailed Nov. 9, 2023, 12 pages.

Written Opinion for International Application No. PCT/CN2022/085397, mailed Jun. 20, 2022, 08 Pages.

Zhang Q., "Transformer Transducer: A Streamable Speech Recognition Model With Transformer Encoders and Rnn-t Loss," 2020 IEEE International Conference on Acoustics, Speech and Signal Processing (ICASSP), May 4, 2020, 5 pages.

* cited by examiner

1011

1012

1013

100

102

103

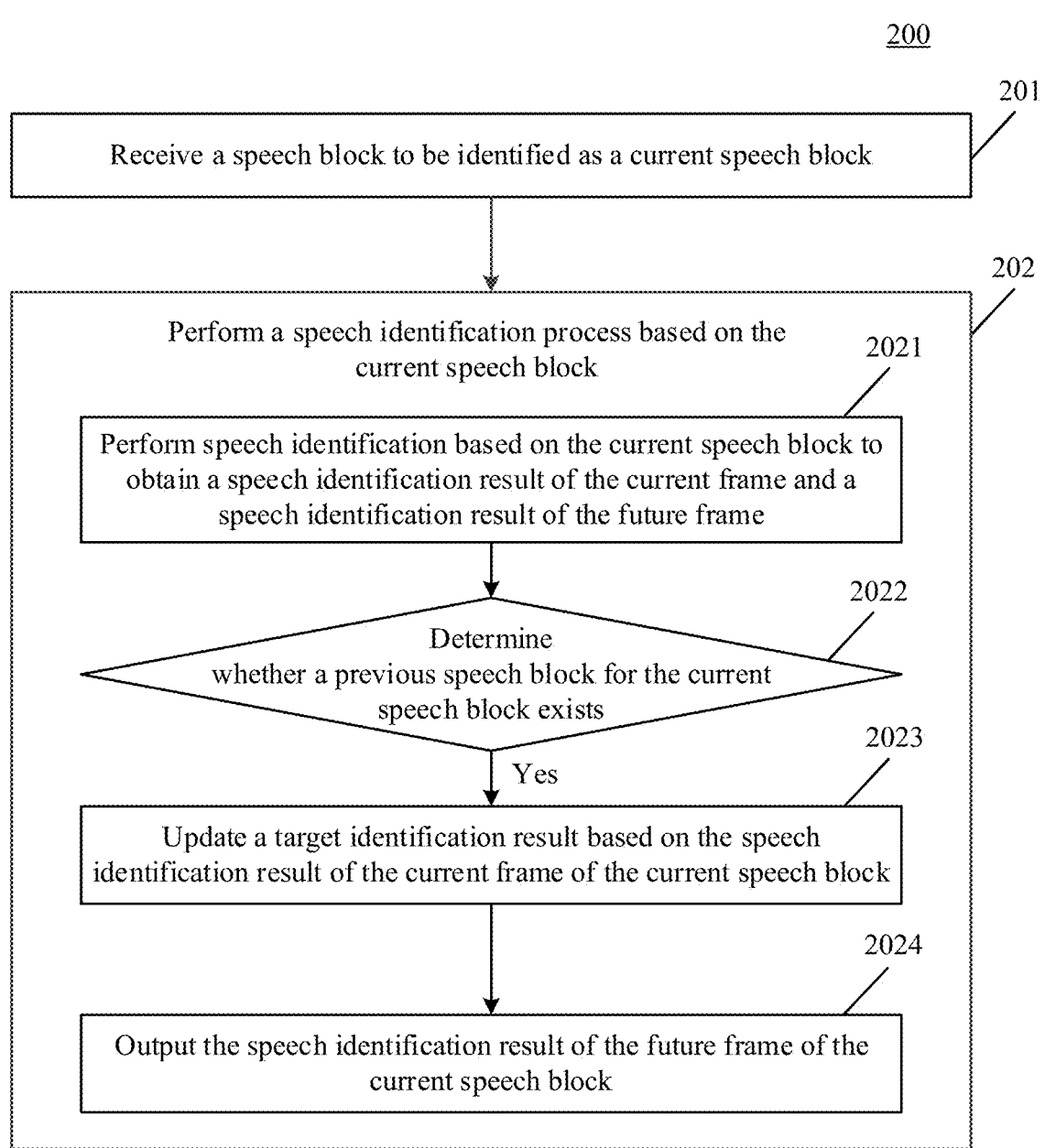

<u>200</u>

201

Receive a speech block to be identified as a current speech block

202

Perform a speech identification process based on the current speech block

2021

Perform speech identification based on the current speech block to obtain a speech identification result of the current frame and a speech identification result of the future frame

2022

Determine whether a previous speech block for the current speech block exists

Yes

2023

Update a target identification result based on the speech identification result of the current frame of the current speech block

2024

Output the speech identification result of the future frame of the current speech block

FIG. 2

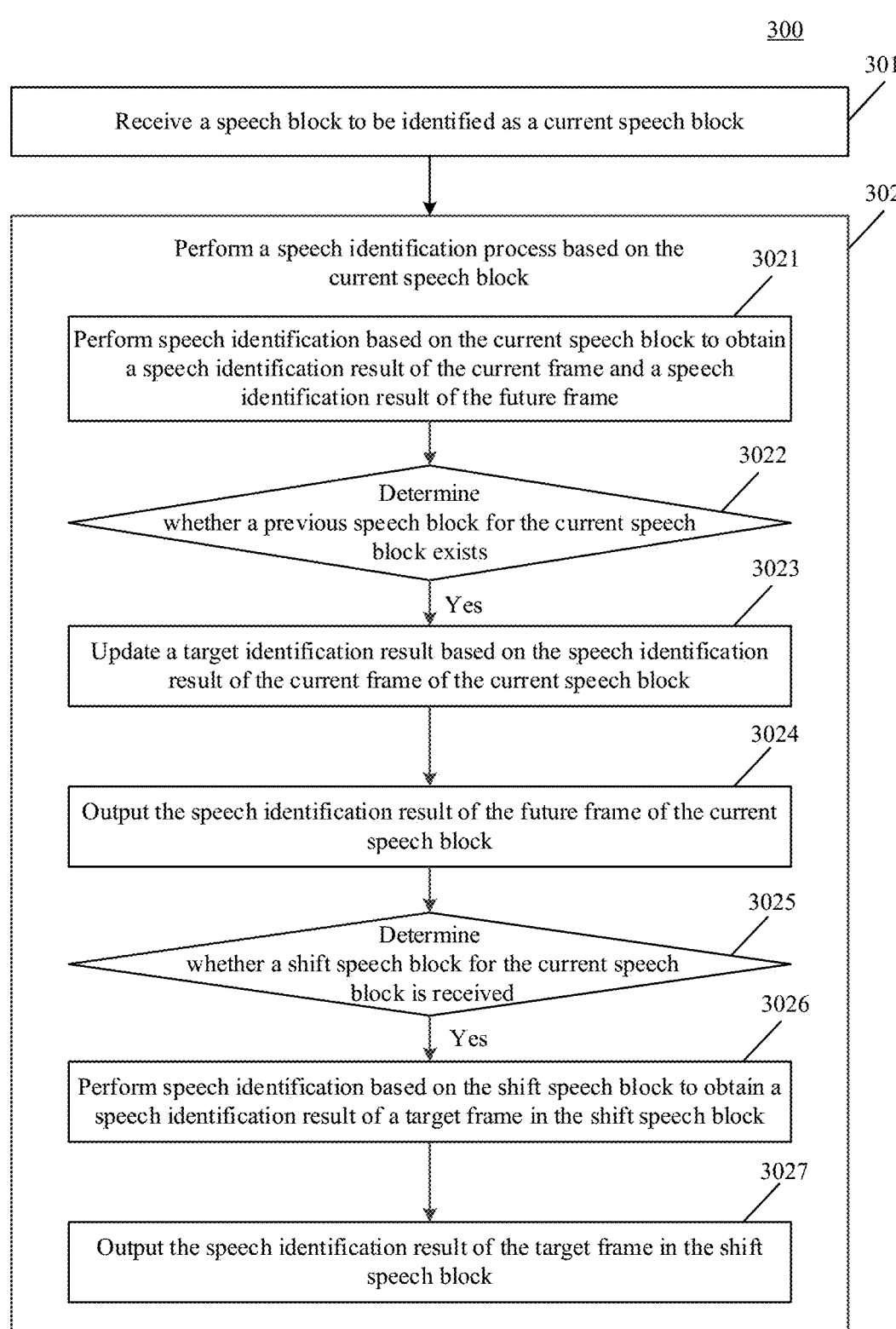

300

301

Receive a speech block to be identified as a current speech block

302

Perform a speech identification process based on the current speech block
3021

Perform speech identification based on the current speech block to obtain a speech identification result of the current frame and a speech identification result of the future frame

3022

Determine whether a previous speech block for the current speech block exists

Yes

3023

Update a target identification result based on the speech identification result of the current frame of the current speech block

3024

Output the speech identification result of the future frame of the current speech block

3025

Determine whether a shift speech block for the current speech block is received

Yes

3026

Perform speech identification based on the shift speech block to obtain a speech identification result of a target frame in the shift speech block

3027

Output the speech identification result of the target frame in the shift speech block

SPEECH PROCESSING METHOD AND APPARATUS, AND ELECTRONIC DEVICE

CROSS-REFERENCE TO RELATED APPLICATIONS

The present application is the national phase application of PCT International Patent Application No. PCT/CN2022/085397, filed on Apr. 6, 2022 which claims the priority to Chinese Patent Application No. 202110470941.1, titled "SPEECH PROCESSING METHOD AND APPARATUS, AND ELECTRONIC DEVICE", filed on Apr. 28, 2021 with the Chinese Patent Office, both of which are incorporated herein by reference in their entireties.

FIELD

The present disclosure relates to the technical field of computers, and in particular to a speech processing method, a speech processing apparatus, and an electronic device.

BACKGROUND

As an important application scenario of speech products, streaming speech identification has high requirements for high accuracy and low latency. In order to improve identification accuracy of a streaming speech, a bidirectional neural network is often used for acoustic modeling. The self-attention network (SAN), as a kind of the bidirectional neural network, is increasingly used in speech products due to high computing parallelism and strong modeling effect. However, in the modeling process of SAN, with the increase of information of used future frames, although the identification accuracy after modeling is to be improved, the identification delay is increased accordingly. How to obtain an identification result with low delay while ensuring identification accuracy is a technical problem in a streaming speech identification product based on the SAN.

SUMMARY

The content part of the present disclosure is provided to introduce concepts in a brief form, and these concepts are to be described in detail in the following embodiments. The content of the present disclosure is not intended to identify the key features or essential features of the claimed technical solutions, nor is it intended to be used to limit the scope of the claimed technical solutions.

According to the embodiments of the present disclosure, a speech processing method, a speech processing apparatus, and an electronic device are provided to reduce an output delay of a speech identification result without changing identification accuracy.

In a first aspect, a speech processing method is provided according to an embodiment of the present disclosure. The speech processing method includes: receiving a speech block to be identified as a current speech block, where the speech block includes a past frame, a current frame and a future frame; performing a speech identification process based on the current speech block, where the speech identification process includes: performing speech identification based on the current speech block to obtain a speech identification result of the current frame and a speech identification result of the future frame; determining whether a previous speech block for the current speech block exists, where a current frame of the previous speech block is before and adjacent to the current frame of the current speech block; in a case that the previous speech block for the current speech block exists, updating a target identification result based on the speech identification result of the current frame of the current speech block, where the target identification result includes a speech identification result of a future frame of the previous speech block; and outputting the speech identification result of the future frame of the current speech block.

In a second aspect, a speech processing apparatus is provided according to an embodiment of the present disclosure. The speech processing apparatus includes: a reception unit and an identification unit. The reception unit is configured to receive a speech block to be identified as a current speech block, where the speech block includes a past frame, a current frame and a future frame. The identification unit is configured to perform a speech identification process based on the current speech block, where the speech identification process includes: performing speech identification based on the current speech block to obtain a speech identification result of the current frame and a speech identification result of the future frame; determining whether a previous speech block for the current speech block exists, where a current frame of the previous speech block is before and adjacent to the current frame of the current speech block; in a case that the previous speech block for the current speech block exists, updating a target identification result based on the speech identification result of the current frame of the current speech block, where the target identification result includes a speech identification result of a future frame of the previous speech block; and outputting the speech identification result of the future frame of the current speech block.

In a third aspect, an electronic device is provided according to an embodiment of the present disclosure. The electronic device includes one or more processors and a storage device. The storage device stores one or more programs. The one or more programs, when executed by the one or more processors, causes the one or more programs to perform the speech processing method provided in the first aspect.

In a fourth aspect, a computer-readable medium is provided according to an embodiment of the present disclosure. The computer-readable medium stores a computer program. The computer program, when executed by a processor, causes the processor to perform the speech processing method provided in the first aspect.

With the speech processing method, the speech processing apparatus, and the electronic device according to the embodiments of the present disclosure, a speech block to be identified is received as a current speech block, and then a speech identification process is performed based on the current speech block. The speech identification process includes: performing speech identification based on the current speech block to obtain a speech identification result of the current frame and a speech identification result of the future frame; determining whether a previous speech block for the current speech block exists; in a case that the previous speech block for the current speech block exists, updating a target identification result based on the speech identification result of the current frame of the current speech block, and outputting the speech identification result of the future frame of the current speech block. In this way, the speech identification result of the future frame of the current speech block may be displayed on a screen, and after a speech identification result of a current frame of a next speech block is received, the speech identification result of the future frame of the current speech block is updated based on the speech identification result of the current frame of the next speech block, thereby reducing the output delay of the speech identification result without changing identification accuracy.

BRIEF DESCRIPTION OF THE DRAWINGS

The above and other features, advantages and aspects of the embodiments of the present disclosure will be more apparent in conjunction with the accompanying drawings and with reference to the following embodiments. Throughout the drawings, the same or similar reference numerals represent the same or similar elements. It should be understood that the drawings are schematic and the originals and elements are unnecessarily drawn to scale.

FIG. 2 is a flow chart of a speech processing method according to an embodiment of the present disclosure;

FIG. 3 is a flow chart of a speech processing method according to another embodiment of the present disclosure;

DETAILED DESCRIPTION OF THE EMBODIMENTS

The embodiments of the present disclosure are described in detail below with reference to the accompanying drawings. Although the drawings show some embodiments of the present disclosure, it should be understood that the present disclosure can be implemented in various forms and is not limited to the embodiments. The embodiments are provided for a more thorough and complete understanding of the present disclosure. It should be understood that the drawings and the embodiments in the present disclosure are only illustrative of the disclosure, and are not intended to limit the protection scope of the present disclosure.

It should be understood that the steps of the method according to the embodiments of the present disclosure may be performed in different orders, and/or be performed in parallel. In addition, the method embodiments may include additional steps and/or omit to perform the illustrated steps, not limiting the scope of the present disclosure.

The term "including" and its variants as used herein are open-ended includes, that is, "including but not limited to". The term "based on" means "based at least in part on." The term "one embodiment" means "at least one embodiment". The term "another embodiment" means "at least one additional embodiment". The term "some embodiments" means "at least some embodiments". Definitions of other terms are provided in the following description.

It should be noted that, the terms "first" "second" and so on mentioned in the present disclosure are only used to distinguishing different apparatuses, modules or units, rather than limit an order of functions performed by the apparatus, module or unit or limit interdependence.

It should be noted that, the terms "one" and "multiple" mentioned in the present disclosure are schematic rather than restrictive, and should be understood as "one or more" by those skilled in the art, otherwise explicitly illustrated in the context.

The names of messages or information exchanged between multiple devices in the embodiments of the present disclosure are only illustrative, and are not intended to limit the scope of the messages or information.

Figure 1:
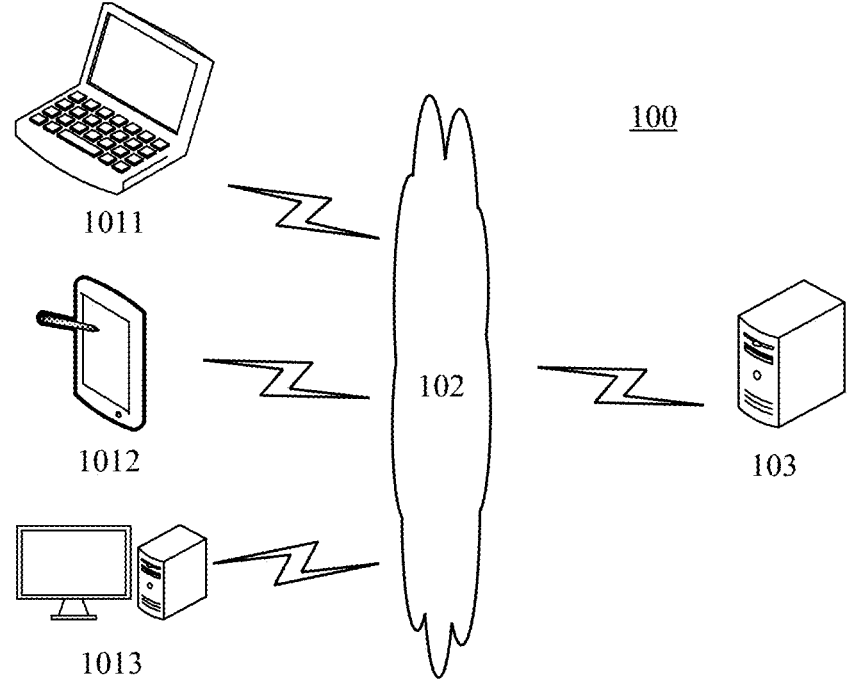
FIG. 1 is a schematic diagram of an exemplary system architecture to which the embodiments of the present disclosure may be applied.

FIG. 1 shows a schematic diagram of an exemplary system architecture 100 to which a speech processing method according to the embodiments of the present disclosure may be applied.

As shown in FIG. 1, the system architecture 100 may include a terminal device 1011, a terminal device 1012, a terminal device 1013, a network 102, and a server 103. The network 102 is configured to provide a medium for communication links between the terminal devices 1011, 1012 and 1013 and the server 103. The network 102 may include various connection types, such as wired communication links, wireless communication links, and optical fiber cables.

Users may use the terminal devices 1011, 1012 and 1013 to interact with the server 103 through the network 102 to perform operations such as transmitting messages and receiving messages. For example, the server 103 may receive speech information from the terminal devices 1011, 1012, and 1013, the terminal devices 1011, 1012, and 1013 may receive speech identification results from the server 103, and the terminal devices 1011, 1012, and 1013 may obtain a speech identification model from the server 103. The terminal devices 1011, 1012 and 1013 may be installed with various communication client applications, such as a speech identification application and instant messaging software.

Each of the terminal devices 1011, 1012 and 1013 may receive a speech block to be identified as a current speech block, and perform a speech identification process based on the current speech block. The speech identification process includes: performing speech identification based on the current speech block to obtain a speech identification result of a current frame and a speech identification result of a future frame; determining whether a previous speech block for the current speech block exists; in a case that the previous speech block for the current speech block exists, updating a target identification result based on the speech identification result of the current frame of the current speech block; and outputting the speech identification result of the future frame of the current speech block.

The terminal devices 1011, 1012 and 1013 may be hardware or software. In a case that the terminal devices 1011, 1012 and 1013 are hardware, the terminal devices 1011, 1012 and 1013 may be various electronic devices having a display screen and supporting information interaction, including but not limited to smart phones, tablets, and laptops. In a case that the terminal devices 1011, 1012 and 1013 are software, the terminal devices 1011, 1012 and 1013 may be installed in the electronic devices listed above. The terminal devices 1011, 1012 and 1013 may be implemented as multiple software or software modules (such as multiple software or software modules for providing distributed services), or may be implemented as a single software or software module. Whether the terminal devices 1011, 1012 and 1013 are hardware or software is not limited herein.

The server 103 may be a server providing various services. For example, the server 103 may process a speech block to be identified received from one of the terminal devices 1011, 1012, and 1013. The server 103 may receive a speech block to be identified from one of the terminal devices 1011, 1012, and 1013 as a current speech block, and then performs a speech identification process based on the current speech block. The speech identification process includes: performing speech identification based on the current speech block to obtain a speech identification result of a current frame and a speech identification result of a future frame; determining whether a previous speech block for the current speech block exists; in a case that the previous speech block for the current speech block exists, updating a target identification result based on the speech identification result of the current frame of the current speech block; and outputting the speech identification result of the future frame of the current speech block. For example, the speech identification result of the future frame of the current speech block may be outputted to the terminal devices 1011, 1012, and 1013.

It should be noted that the server 103 may be hardware or software. In a case that the server 103 is hardware, the server 103 may be implemented as a distributed server cluster including multiple servers, or may be implemented as a single server. In a case that the server 103 is software, the server 103 may be implemented as multiple software or software modules (for example, to provide distributed services), or may be implemented as a single software or software module. Whether the server 103 is hardware or software is not limited herein.

It should be noted that the speech processing method according to the embodiments of the present disclosure may be performed by the terminal devices 1011, 1012 and 1013, and then the speech processing apparatus is usually arranged in the terminal devices 1011, 1012 and 1013. The speech processing method according to the embodiments of the present disclosure may be performed by the server 103, and then the speech processing apparatus is usually arranged in the server 103.

It should be further noted that, in a case that the speech processing method according to the embodiments of the present disclosure is performed by the terminal devices 1011, 1012, and 1013, if the terminal devices 1011, 1012, and 1013 store a pre-trained speech identification model locally, the example system architecture 100 may not include the network 102 and the server 103.

It should be understood that the number of the terminal devices, the network and the server in FIG. 1 is only schematic. According to implementation requirements, any number of terminal devices, networks and servers may be arranged.

Reference is made to FIG. 2, which shows a flow chart 200 of a speech processing method according to an embodiment of the present disclosure. The speech processing method includes the following steps 201 and 202.

In step 201, a speech block to be identified is received as a current speech block.

In the embodiment, an execution body (such as the terminal device or the server shown in FIG. 1) of the speech processing method may receive a speech block to be identified as a current speech block. The speech block to be identified is usually transmitted in a speech stream form which indicates that that a speech may be transmitted and processed as a stable and continuous stream via a network.

In a streaming speech identification scenario, a complete speech is usually divided into several overlapping speech blocks. Each of the speech blocks usually includes a past frame (frame Np), a current frame (frame Nc) and a future frame (frame Nf). Each of the speech blocks usually includes the same number of frames. The past frame and the future frame are configured to provide context for performing speech identification on the current frame. An identification result corresponding to the current frame is displayed on a screen in a stream form. Generally, stream identification is performed on the speech blocks from left to right until a last speech block is calculated, where a distance for each movement is equal to the number of the current frame.

In step 202, a speech identification process is performed based on the current speech block. The speech identification process includes: performing speech identification based on the current speech block to obtain a speech identification result of the current frame and a speech identification result of the future frame; determining whether a previous speech block for the current speech block exists; in a case that the previous speech block for the current speech block exists, updating a target identification result based on the speech identification result of the current frame of the current speech block; and outputting the speech identification result of the future frame of the current speech block.

In the embodiment, the execution body may perform the following speech identification process based on the current speech block.

In the embodiment, the speech identification process in step 202 may include the following sub steps 2021, 2022, 2023 and 2024.

In step 2021, speech identification is performed based on the current speech block to obtain a speech identification result of the current frame and a speech identification result of the future frame.

In the embodiment, the execution body may perform speech identification based on the current speech block to obtain a speech identification result of the current frame and a speech identification result of the future frame. The speech identification may be performed on the current speech block by using a conventional speech identification method. The conventional speech identification method is not repeated herein.

In step 2022, it is determined whether a previous speech block for the current speech block exists.

In the embodiment, the execution body may determine whether a previous speech block for the current speech block exists. A current frame of the previous speech block for the current speech block is usually before and adjacent to the current frame of the current speech block. That is, the current speech block may be obtained by performing shifting forward by the number of the current frame from the previous speech block.

In a case that the previous speech block for the current speech block exists, the execution body may perform step 2023.

In step 2023, in a case that the previous speech block for the current speech block exists, a target identification result is updated based on the speech identification result of the current frame of the current speech block.

In the embodiment, in a case that it is determined in step 2022 that the previous speech block for the current speech block exists, the execution body may update a target identification result based on the speech identification result of the current frame of the current speech block. The target identification result may include a speech identification result of a future frame of the previous speech block.

Generally, after performing speech identification on the previous speech block to obtain a speech identification result of a future frame of the previous speech block, the speech identification result of the future frame of the previous speech block may be presented (that is, be displayed virtually on a screen). Then, in a case that it is determined that the previous speech block for the current speech block exists, the speech identification result of the future frame of the previous speech block may be updated based on the speech identification result of the current frame of the current speech block.

In performing speech identification on the future frame of the previous speech block, only a past frame and a current frame of the previous speech block are used as context information of the future frame of the previous speech block, that is, the context information includes past speech information and does not include future speech information. In performing speech identification on the current frame (where the current frame includes the future frame of the previous speech block) of the current speech block, context information of the current frame of the current speech block includes both past speech information and future speech information. Therefore, compared with the speech identification result of the future frame of the previous speech block, the speech identification result of the current frame of the current speech block is more accurate. The speech identification result of the future frame of the previous speech block is updated based on the speech identification result of the current frame of the current speech block, achieving an accurate final identification result.

In step 2024, the speech identification result of the future frame of the current speech block is outputted.

In the embodiment, the execution body may output the speech identification result of the future frame of the current speech block obtained in step 2021.

In a case that the execution body is a server, the execution body may output the speech identification result of the future frame in the current speech block to a terminal of the user from which the speech block is obtained, so that the terminal of the user may display the speech identification result of the future frame of the current speech block on a screen.

In a case that the execution body is a terminal of the user, the execution body may display the speech identification result of the future frame of the current speech block on a screen.

With the speech processing method according to the embodiments of the present disclosure, a speech block to be identified is received as a current speech block, and then a speech identification process is performed based on the current speech block. The speech identification process includes: performing speech identification based on the current speech block to obtain a speech identification result of the current frame and a speech identification result of the future frame; determining whether a previous speech block for the current speech block exists; in a case that the previous speech block for the current speech block exists, updating a target identification result based on the speech identification result of the current frame of the current speech block, and outputting the speech identification result of the future frame of the current speech block. In this way, the speech identification result of the future frame of the current speech block may be displayed on a screen, and after a speech identification result of a current frame of a next speech block is received, the speech identification result of the future frame of the current speech block is updated based on the speech identification result of the current frame of the next speech block, thereby reducing the output delay of the speech identification result without changing identification accuracy.

Specifically, in performing speech identification on a speech block, it is required to consider a past frame and a future frame of a current frame. Thus, speech identification is not performed on the speech block where the current frame is included until the future frame of the current frame arrives, resulting in a delay of the Nf frame caused by waiting for the future frame Nf. In addition, for a current frame, since a middle part and a front part of the current frame have a large content delay and a rear part of the current frame have a small content delay, the delay of the current frame is expected to be Nc/2 frames. Therefore, an actual delay of displaying an identification result on a screen according to the conventional technology is Nf+Nc/2 frames. With the method according to the embodiments of the present disclosure, the actual delay Nf+Nc/2 frames of displaying the identification result on the screen may be reduced to (Nf+Nc)/2 frames.

It should be noted that an identification delay of a streaming speech product may be further controlled by adjusting Nf.

Reference is further made to FIG. 3, which shows a flow chart 300 of a speech processing method according to another embodiment. According to the flow chart 300, the speech processing method includes the following steps 301 and 302.

In step 301, a speech block to be identified is received as a current speech block.

In the embodiment, the step 301 may be performed in a similar manner in which the step 201 is performed, which is not repeated herein.

In step 302, a speech identification process is performed based on the current speech block. The speech identification process includes: performing speech identification based on the current speech block to obtain a speech identification result of the current frame and a speech identification result of the future frame; determining whether a previous speech block for the current speech block exists; in a case that the previous speech block for the current speech block exists, updating a target identification result based on the speech identification result of the current frame of the current speech block; outputting the speech identification result of the future frame of the current speech block; determining whether a shift speech block for the current speech block is received; in a case that the shift speech block for the current speech block is received, performing speech identification based on the shift speech block to obtain a speech identification result of a target frame in the shift speech block; and outputting the speech identification result of the target frame in the shift speech block.

In the embodiment, the execution body may perform the following speech identification process based on the current speech block.

In the embodiment, the speech identification process in step 302 may include the following sub steps 3021, 3022, 3023, 3024, 3025, 3026, and 3027.

In step 3021, speech identification is performed based on the current speech block to obtain a speech identification result of the current frame and a speech identification result of the future frame.

In step 3022, it is determined whether a previous speech block for the current speech block exists.

In step 3023, in a case that the previous speech block for the current speech block exists, a target identification result is updated based on the speech identification result of the current frame of the current speech block.

In step 3024, the speech identification result of the future frame of the current speech block is outputted.

In the embodiment, the steps 3021 to 3024 may be performed in a similar manner in which the steps 2021 to 2024 are performed, which is not repeated herein.

In step 3025, it is determined whether a shift speech block for the current speech block is received.

In the embodiment, the execution body (such as the terminal device or the server shown in FIG. 1) of the speech processing method may determine whether a shift speech block for the current speech block is received. The shift speech block may be obtained by performing shifting forward by a target frame number from the current speech block, and the target frame number is an integral multiple of the number of the future frame of the current speech block. As an example, the target frame number may be the same as the number of the future frame, that is, the target frame number may be equal to the number of the future frame; the target frame number may be twice the number of the future frame; and the target frame number may be three times the number of the future frame, and so on.

In a case that the shift speech block for the current speech block is received, the execution body may perform step 3026.

In step 3026, in a case that the shift speech block for the current speech block is received, speech identification is performed based on the shift speech block to obtain a speech identification result of a target frame in the shift speech block.

In the embodiment, in the case that it is determined that the shift speech block for the current speech block is received in step 3025, the execution body may perform speech identification based on the shift speech block to obtain a speech identification result of a target frame in the shift speech block. The target frame of the shift speech block is located at an end of the shift speech block and the number of the target frame is equal to the number of the future frame of the current speech block. The target frame may be called as the future frame of the shift speech block.

The speech identification may be performed on the shift speech block by using a conventional speech identification method. The conventional speech identification method is not repeated herein.

In step 3027, the speech identification result of the target frame in the shift speech block is outputted.

In the embodiment, the execution body may output the speech identification result of the target frame in the shift speech block obtained in step 3026.

In a case that the execution body is a server, the execution body may output the speech identification result of the target frame in the shift speech block to a terminal of the user from which the speech block is obtained, so that the terminal of the user may display the speech identification result of the target frame in the shift speech block on a screen.

In a case that the execution body is a terminal of the user, the execution body may display the speech identification result of the target frame in the shift speech block on a screen.

It should be noted that speech identification results of target frames in presented shift speech blocks are usually sorted according to a time sequence in which the shift speech blocks are received.

It may be seen from FIG. 3 that compared with the embodiment shown in FIG. 2, the flow chart 300 of the speech processing method in the embodiment includes steps of shifting a speech block and outputting a speech identification result of a target frame in a shift speech block. Therefore, in the solution described in the embodiment, speech identification may be performed on a shift speech block obtained by shifting the current speech block, and a speech identification result is outputted, further reducing the actual delay of outputting an identification result. In this way, an identification delay between two speech blocks is reduced, and the identification delay is further reduced from (Nf+Nc)/2 frames to Nf/2 frames.

In some embodiments, the target identification result may further include a speech a result of a target frame in a shift speech block for the previous speech block. The shift speech block for the previous speech block may be obtained by shifting the previous speech block forward to a target frame number, and the target frame number may be an integer multiple of the number of the future frame. For example, the target frame number may be one time, two times, three times, or four times the number of the future frame. The target frame in the shift speech block for the previous speech block is usually located at the end of the shift speech block for the previous speech block, and the number of the target frame in the shift speech block is equal to the number of the future frame. Therefore, in a case that the previous speech block for the current speech block exists, the execution body may update the speech identification result of the target frame in the shift speech block for the previous speech block based on the speech identification result of the current frame in the current speech block.

As an example, in a case that a previous speech block has three corresponding shift speech blocks including a first shift speech block, a second shift speech block and a third shift speech block, the first shift speech block is obtained by shifting the previous speech block forward by the number of the future frame, the second shift speech block is obtained by shifting the previous speech block forward by twice the number of the future frame, the third shift speech block is obtained by shifting the previous speech block forward by three times the number of the future frame, R1 represents a speech identification result of a future frame of the first shift speech block, R2 represents a speech identification result of a future frame of the second shift speech block, and R3 represents a speech identification result of a future frame of the third shift speech block, then the execution body may update the speech identification results of R1, R2 and R3 based on the speech identification result of the current frame in the current speech block.

In some embodiments, a maximum ratio of the target frame number to the number of the future frame of the current speech block is a target value, and the target value is a ratio of the number of the current frame of the current speech block to the number of the future frame of the current speech block. As an example, in a case that the number of the current frame is 3N and the number of the future frame is N, the target value is 3, and the maximum ratio of the target frame number to the number of the future frame is 3. In this case, the shift speech block for the current speech block usually includes speech blocks respectively obtained by shifting the current speech block forward by one time, two times and three times the number of the future frame. In this way, the computation in performing speech identification may be reduced while reducing the delay.

In some embodiments, the speech identification process may further include: determining whether a next speech block for the current speech block is received. A current frame in the next speech block for the current speech block is usually after and adjacent to the current frame in the current speech block, that is, the next speech block may be obtained by performing shifting forward by the number of the current frame from the current speech block. In a case that the next speech block for the current speech block is received, the execution body may determine the next speech block as a current speech block and perform the speech identification process until the speech input is ended.

Figure 4:
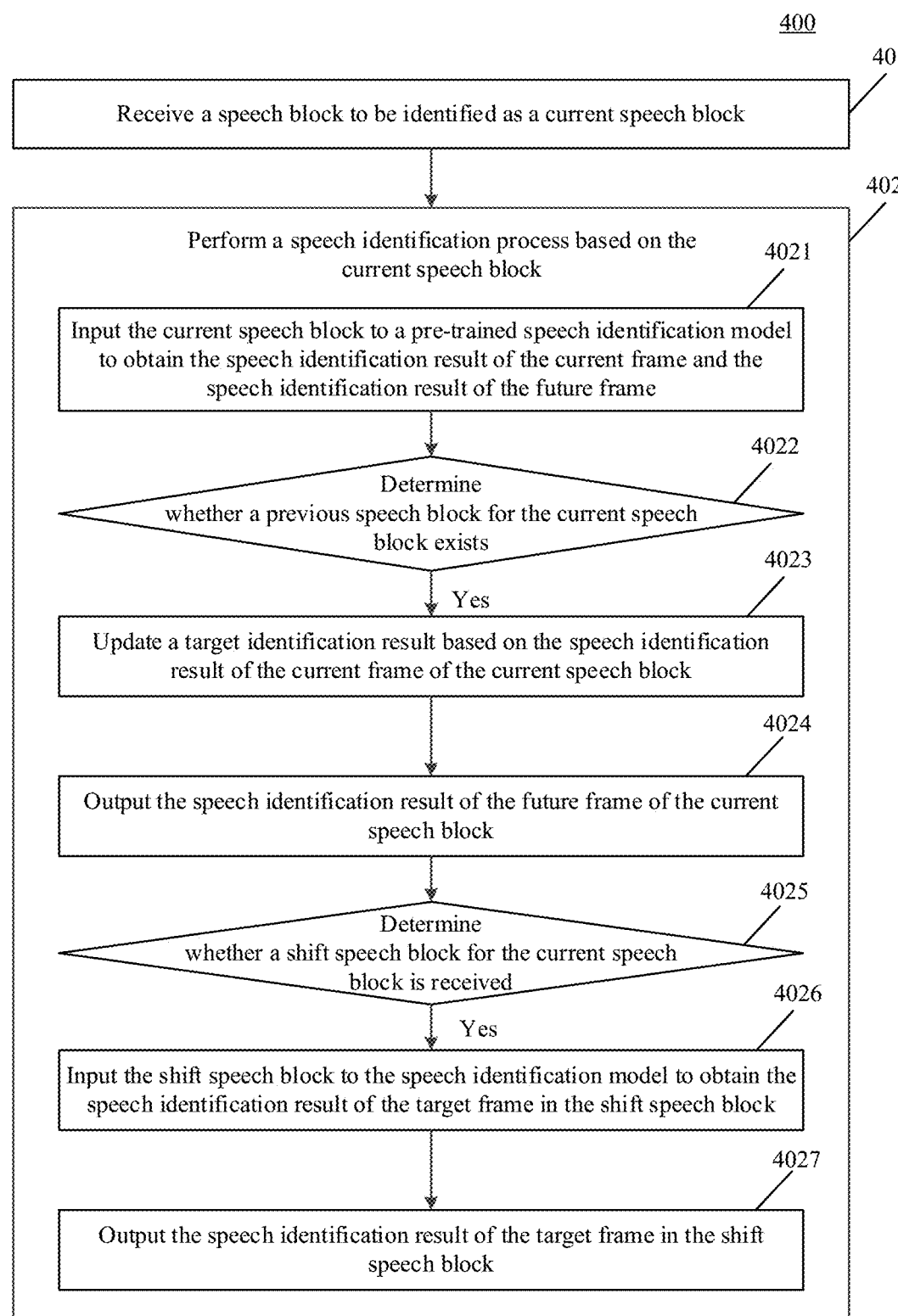
FIG. 4 is a flow chart of a speech processing method according to another embodiment of the present disclosure.

Reference is further made to FIG. 4, which shows a flow chart 400 of a speech processing method according to another embodiment. According to the flow chart 400, the speech processing method includes the following steps 401 and 402.

In step 401, a speech block to be identified is received as a current speech block.

In the embodiment, the step 401 may be performed in a similar manner in which the step 201 is performed, which is not repeated herein.

In step 402, a speech identification process is performed based on the current speech block. The speech identification process includes: inputting the current speech block to a pre-trained speech identification model to obtain the speech identification result of the current frame and the speech identification result of the future frame; determining whether the previous speech block for the current speech block exists; in a case that the previous speech block for the current speech block exists, updating the target identification result based on the speech identification result of the current frame in the current speech block; outputting the speech identification result of the future frame in the current speech block; determining whether the shift speech block for the current speech block is received; in a case that the shift speech block for the current speech block is received, inputting the shift speech block to the speech identification model to obtain the speech identification result of the target frame in the shift speech block; and outputting the speech identification result of the target frame in the shift speech block.

In the embodiment, the execution body may perform the following speech identification process based on the current speech block.

In the embodiment, the speech identification process in step 402 may include the following sub steps 4021, 4022, 4023, 4024, 4025, 4026, and 4027.

In step 4021, the current speech block is inputted to a pre-trained speech identification model to obtain the speech identification result of the current frame and the speech identification result of the future frame.

In the embodiment, the execution body (such as the terminal device or the server shown in FIG. 1) of the speech processing method may input the current speech block to a pre-trained speech identification model to obtain the speech identification result of the current frame and the speech identification result of the future frame. The speech identification model may be configured to represent a corresponding relationship between speech blocks and identification results of speech frames in the speech blocks. In performing speech identification with the speech identification model, context information is provide the speech identification model based on the past frame and the future frame, so that the outputted speech identification result of the current frame is accurate.

In step 4022, it is determined whether the previous speech block for the current speech block exists.

In step 4023, in a case that the previous speech block for the current speech block exists, the target speech result is updated based on the speech identification result of the current frame in the current speech block.

In step 4024, the speech identification result of the future frame in the current speech block is outputted.

In step 4025, it is determined whether the shift speech block for the current speech block is received.

In the embodiment, the steps 4022 to 4025 may be performed in a similar manner in which the steps 3022 to 3025 are performed, which is repeated herein.

In step 4026, in a case that the shift speech block for the current speech block is received, the shift speech block is inputted to the speech identification model to obtain the speech identification result of the target frame in the shift speech block.

In the embodiment, in the case that it is determined that the shift speech block for the current speech block is received in step 4025, the execution body may input the received shift speech block to the speech identification model to obtain the speech identification result of the target frame in the shift speech block. The target frame in the shift speech block may be located at the end of the shift speech block and the number of the target frame is equal to the number of the future frame, and the target frame may be called as the future frame of the shift speech block.

The speech identification model may be configured to represent a corresponding relationship between speech blocks and identification results of speech frames in the speech blocks.

In step 4027, the speech identification result of the target frame in the shift speech block is outputted.

In the embodiment, the step 4027 may be performed in a similar manner in which the step 3027 is performed, which is not repeated herein.

It may be seen from FIG. 4 that, compared with the embodiment shown in FIG. 3, the flow chart 400 of the speech processing method in the embodiment includes the step of performing speech identification on the current speech block and the shift speech block by using the speech identification model. Therefore, with the solution according to the embodiment, the accuracy of speech identification can be further improved.

In some embodiments, the speech identification model may be obtained by performing training based on the self-attention network. The speech identification model may include but is not limited to an end-to-end model, such as an acoustic model based on an HMM (Hidden Markov Model) framework, a CTC (Connectionist Temporal Classification) model based on a neural network, an RNN-T (Recurrent Neural Network Transducer) model, an attention model, and an acoustic model obtained by performing training based on a self-attention network.

Figure 5:
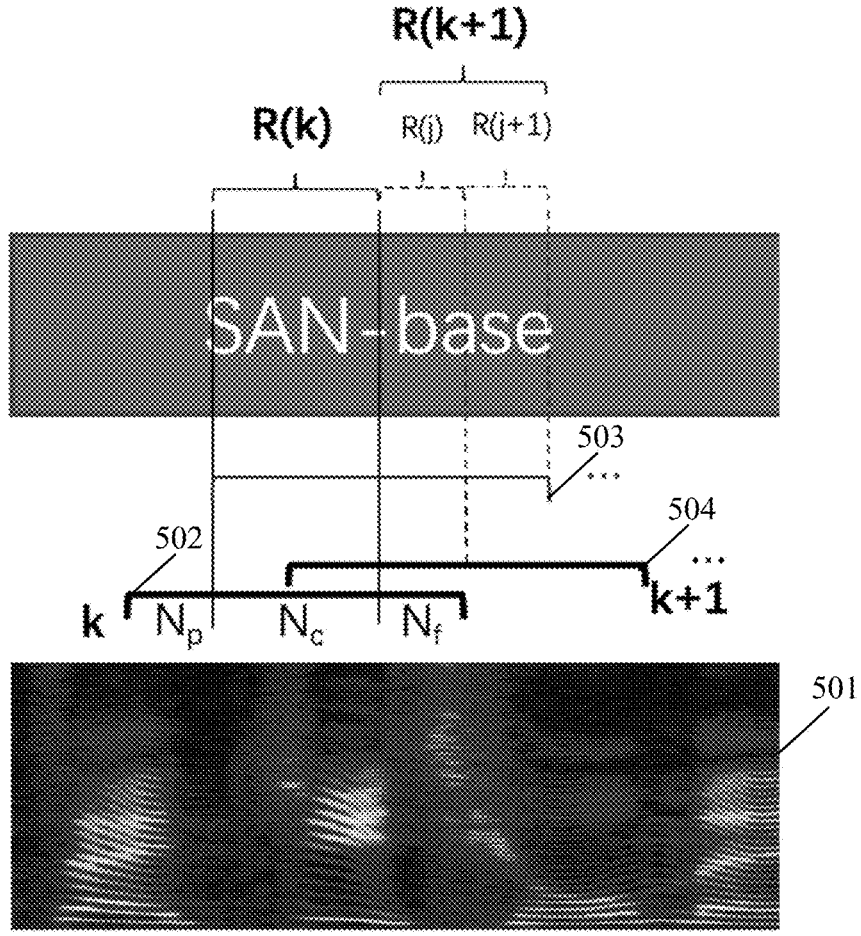
FIG. 5 is a schematic diagram of an application scenario of a speech processing method according to an embodiment of the present disclosure.

Reference is further made to FIG. 5, which is a schematic diagram of an application scenario of a speech processing method according to an embodiment. In the application scenario shown in FIG. 5, speech data 501 is divided into several overlapping speech blocks to be inputted in a stream. Numeral 502 represents a speech block k, including a past frame Np, a current frame Nc and a future frame Nf. On a screen of a terminal of the user, a speech identification result $R(k)$ corresponding to the current frame Nc, a speech identification result $R(j)$ corresponding to the future frame Nf, a speech identification result $R(j+1)$ corresponding to a future frame in a shift speech block 503 corresponding to the speech block k are displayed. In a case that a speech block k+1 represented by numeral 504 is received, the speech block k+1 may be inputted to a speech identification model to obtain a speech identification result $R(k+1)$ of a current frame in the speech block k+1, and the terminal of the user may update the speech identification result $R(j)$ and the speech identification result $R(j+1)$ based on the speech identification result $R(k+1)$.

Figure 6:
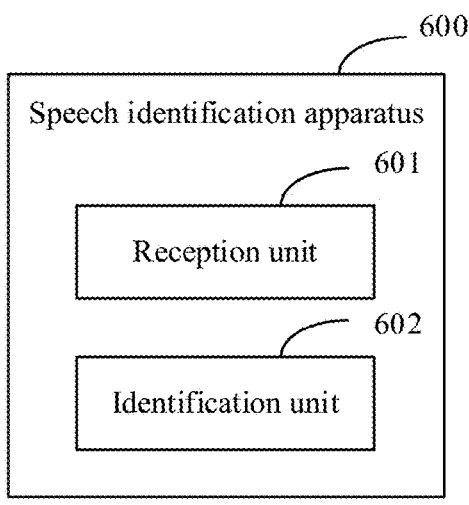
FIG. 6 is a schematic structural diagram of a speech processing apparatus according to an embodiment of the present disclosure.

Further referring to FIG. 6, as an implementation of the methods shown in the above Figures, a speech processing apparatus is provided according to an embodiment of the present disclosure. The apparatus embodiment corresponds to the method embodiment shown in FIG. 2. The apparatus may be applied to various electronic devices.

As shown in FIG. 6, the speech processing apparatus 600 includes: a reception unit 601 and an identification unit 602. The reception unit 601 is configured to receive a speech block to be identified as a current speech block, where the speech block includes a past frame, a current frame and a future frame. The identification unit 602 is configured to perform a speech identification process based on the current speech block. The speech identification process includes: performing speech identification based on the current speech block to obtain a speech identification result of the current frame and a speech identification result of the future frame; determining whether a previous speech block for the current speech block exists, where a current frame of the previous speech block is before and adjacent to the current frame of the current speech block; in a case that the previous speech block for the current speech block exists, updating a target identification result based on the speech identification result of the current frame of the current speech block, where the target identification result includes a speech identification result of a future frame of the previous speech block; and outputting the speech identification result of the future frame of the current speech block.

In the embodiment, the processing performed by the reception unit 601 and the identification unit 602 of the speech processing apparatus 600 may refer to the step 201 and the step 202 in the embodiments corresponding to FIG. 2.

In some embodiments, the speech identification process may further include: determining whether a shift speech block for the current speech block is received, where the shift speech block is obtained by shifting the current speech block forward by a target frame number, and the target frame number is an integral multiple of the number of the future frame in the current speech block; in a case that the shift speech block for the current speech block is received, performing speech identification based on the shift speech block to obtain a speech identification result of a target frame in the shift speech block, where the target frame of the shift speech block is located at an end of the shift speech block and the number of the target frame is equal to the number of the future frame of the current speech block; and outputting the speech identification result of the target frame in the shift speech block.

In some embodiments, the target identification result may further include a speech identification result of a target frame in a shift speech block for the previous speech block.

In some embodiments, a maximum ratio of the target frame number to the number of the future frame in the current speech block may be a target value, and the target value may be a ratio of the number of the current frame to the number of the future frame.

In some embodiments, the identification unit 602 may be configured to perform speech identification based on the current speech block to obtain the speech identification result of the current frame and the speech identification result of the future frame by: inputting the current speech block to a pre-trained speech identification model to obtain the speech identification result of the current frame and the speech identification result of the future frame; and the identification unit 602 may be configured to perform speech identification based on the shift speech block to obtain the speech identification result of the target frame in the shift speech block by: inputting the shift speech block to the speech identification model to obtain the speech identification result of the target frame in the shift speech block.

In some embodiments, the speech identification model may be obtained by performing training based on a self-attention network.

In some embodiments, the speech identification process may further include: determining whether a next speech block for the current speech block is received, where a current frame of the next speech block is behind and adjacent to the current frame in the current block. The apparatus may further include a feedback unit (not shown in the FIG. 6). The feedback unit may be configured to, in a case that the next speech block for the current speech block is received, determine the next speech block as a current speech block and perform the speech identification process.

Hereinafter, reference is made to FIG. 7, which shows a schematic structural diagram of an electronic device (such as the server or the terminal device shown in FIG. 1) 700 suitable for implementing the embodiments of the present disclosure. The terminal devices according to the embodiments of the present disclosure may include, but are not limited to, mobile terminals such as mobile phones, laptops, digital broadcast receivers, PDAs (personal digital assistants), PADs (tablet computers), PMPs (portable multimedia players), vehicle terminals (such as vehicle navigation terminals), and fixed terminals such as digital TVs, desktop computers, and the like. The electronic device shown in FIG. 7 is only exemplary, and should not indicate any limitation to the function and application scope of the embodiments of the present disclosure.

Figure 7:
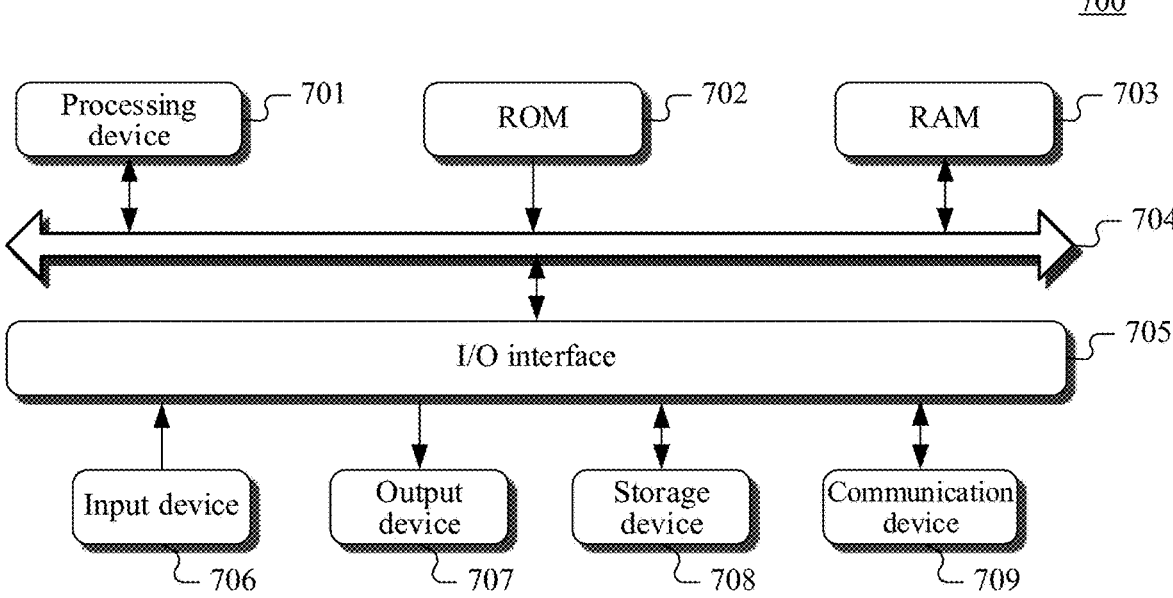
FIG. 7 is a schematic structural diagram of a computer system suitable for implementing an electronic device according to an embodiment of the present disclosure.

As shown in FIG. 7, the electronic device 700 may include a processing device 701 (such as a central processor and a graphics processor) which may execute various operations and processing through a program stored in a Read Only Memory (ROM) 702 or a program loaded from the storage device 708 into a Random Access Memory (RAM) 703. The RAM 703 is further configured to store various programs and data required by the electronic device 700. The processing device 701, the ROM 702 and the RAM 703 are connected to each other through a bus 704. An Input/output (I/O) interface 705 is also connected to the bus 704.

Generally, the I/O interface 705 may be connected to: an input device 706, such as a touch screen, a touch panel, a keyboard, a mouse, a camera, a microphone, an accelerometer, and a gyroscope; an output device 707, such as a liquid crystal display (LCD), a speaker, and a vibrator; a storage device 708 such as a magnetic tape and a hard disk; and a communication device 709. The communication device 709 enables the electronic device 700 to perform wireless or wired communication with other devices for data exchanging. Although FIG. 7 shows an electronic device 700 having various components, it should be understood that the illustrated components are not necessarily required to all be implemented or included. Alternatively, more or fewer components may be implemented or included. Each of the blocks shown in FIG. 7 may represent one device or multiple devices according to requirements.

Particularly, according to an embodiment of the present disclosure, the processes described above in conjunction with flow charts may be implemented as a computer software program. For example, a computer program product is further provided in an embodiment in the present disclosure, including a computer program carried on a computer readable medium. The computer program includes program codes for performing the method shown in the flow charts. In the embodiment, the computer program may be downloaded and installed from the network via the communication device 709, or installed from the storage device 708, or installed from the ROM 702. When the computer program is executed by the processing device 701, the above-mentioned functions defined in the method according to the embodiments of the present disclosure are performed. It should be noted that, the computer readable medium mentioned herein may be a computer readable signal medium or a computer readable storage medium or any combination thereof. The computer readable storage medium may be, but is not limited to, a system, an apparatus, or a device in an electronic, magnetic, optical, electromagnetic, infrared, or semiconductive form, or any combination thereof. The computer readable storage medium may be, but is not limited to, an electrical connection with one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), a light storage device, a magnetic storage device or any combination thereof. In an embodiment of the present disclosure, the computer readable storage medium may be any tangible medium containing or storing a program, and the program may be used by or in combination with an instruction execution system, apparatus, or device. In an embodiment of the present disclosure, the computer readable signal medium may be a data signal transmitted in a baseband or transmitted as a part of a carrier wave and carrying computer readable program codes. The transmitted data signal may be in various forms, including but not limited to an electromagnetic signal, an optical signal or any proper combination thereof. The computer readable signal medium may be any computer readable medium other than the computer readable storage medium and can send, propagate or transmit programs to be used by or with an instruction execution system, apparatus or device. The program codes stored in the computer readable medium may be transmitted via any proper medium including but not limited to: wired, optical fiber cable, radio frequency (RF), or any suitable combination of the foregoing.

The computer readable storage medium may be incorporated in the electronic device, or may exist independently without being assembled into the electronic device. The computer readable storage medium carries one or more programs. The one or more programs, when being executed by the electronic device, cause the electronic device to: receive a speech block to be identified as a current speech block, where the speech block includes a past frame, a current frame and a future frame; perform a speech identification process based on the current speech block, where the speech identification process includes: performing speech identification based on the current speech block to obtain a speech identification result of the current frame and a speech identification result of the future frame; determining whether a previous speech block for the current speech block exists, where a current frame of the previous speech block is before and adjacent to the current frame of the current speech block; in a case that the previous speech block for the current speech block exists, updating a target identification result based on the speech identification result of the current frame of the current speech block, where the target identification result includes a speech identification result of a future frame of the previous speech block; and outputting the speech identification result of the future frame of the current speech block.

Computer program code for performing operations in the embodiments of the present disclosure may be written in one or more programming languages, or a combination of the foregoing, and the programming language includes, but is not limited to, object oriented programming languages, such as Java, Smalltalk, and C++, also includes conventional procedural programming languages, such as "C" language or similar programming languages. The program codes may be executed entirely on a user's computer, or be executed partly on the user's computer, or be executed as a standalone software package, or be executed partly on the user's computer and partly on a remote computer, or be executed entirely on the remote computer or server. In a case that the execution of the program code involves a remote computer, the remote computer may be connected to a user's computer via any kind of network, including a local area network (LAN) or a wide area network (WAN), or may be connected to an external computer (for example, via an Internet providing by an Internet service provider).

The flow charts and schematic diagrams in the Figures shows the architecture, functionality and operation of possible implementations of the products of system, method and computer program provided according to the embodiments of the present disclosure. Each block in the flow charts or schematic diagrams may represent a module, a program segment, or a part of code, and the module, the program segment, or the part of code includes one or more executable instructions for implementing specified logical functions. It should be noted that in some alternative implementations, the functions noted in the blocks may be implemented in a different order than those illustrated in the Figures. For example, two blocks shown in succession may in fact be executed substantially in parallel, and they may sometimes be executed in a reverse order, depending upon the functionality involved. It also should be noted that each block in the schematic diagrams and/or flow charts, and combinations of blocks in the schematic diagrams and/or flowcharts, can be implemented by a dedicated hardware-based system which is configured to implement specified functions or operations, or can be implemented by using a combination of dedicated hardware and computer instructions.

According to one or more embodiments of the present disclosure, a speech processing method is provided. The method includes: receiving a speech block to be identified as a current speech block, where the speech block includes a past frame, a current frame and a future frame; performing a speech identification process based on the current speech block, where the speech identification process includes: performing speech identification based on the current speech block to obtain a speech identification result of the current frame and a speech identification result of the future frame; determining whether a previous speech block for the current speech block exists, where a current frame of the previous speech block is before and adjacent to the current frame of the current speech block; in a case that the previous speech block for the current speech block exists, updating a target identification result based on the speech identification result of the current frame of the current speech block, where the target identification result includes a speech identification result of a future frame of the previous speech block; and outputting the speech identification result of the future frame of the current speech block.

According to one or more embodiments of the present disclosure, the speech identification process further includes: determining whether a shift speech block for the current speech block is received, where the shift speech block is obtained by shifting the current speech block forward by a target frame number, and the target frame number is an integral multiple of the number of the future frame in the current speech block; in a case that the shift speech block for the current speech block is received, performing speech identification based on the shift speech block to obtain a speech identification result of a target frame in the shift speech block, where the target frame of the shift speech block is located at an end of the shift speech block and the number of the target frame is equal to the number of the future frame of the current speech block; and outputting the speech identification result of the target frame in the shift speech block.

According to one or more embodiments of the present disclosure, the target identification result further includes a speech identification result of a target frame in a shift speech block for the previous speech block.

According to one or more embodiments of the present disclosure, a maximum ratio of the target frame number to the number of the future frame is a target value, and the target value is a ratio of the number of the current frame to the number of the future frame.

According to one or more embodiments of the present disclosure, the performing speech identification based on the current speech block to obtain a speech identification result of the current frame and a speech identification result of the future frame includes: inputting the current speech block to a pre-trained speech identification model to obtain the speech identification result of the current frame and the speech identification result of the future frame; and performing speech identification based on the shift speech block to obtain a speech identification result of a target frame in the shift speech block includes: inputting the shift speech block to the speech identification model to obtain the speech identification result of the target frame in the shift speech block.

According to one or more embodiments of the present disclosure, the speech identification model is obtained by performing training based on a self-attention network.

According to one or more embodiments of the present disclosure, the speech identification process further includes: determining whether a next speech block for the current speech block is received, where a current frame of the next speech block is behind and adjacent to the current frame in the current block; and the method further includes: in a case that the next speech block for the current speech block is received, determining the next speech block as a current speech block, and performing the speech identification process.

According to one or more embodiments of the present disclosure, a speech processing apparatus is provided. The apparatus includes: a reception unit and an identification unit. The reception unit is configured to receive a speech block to be identified as a current speech block, where the speech block includes a past frame, a current frame and a future frame. The identification unit is configured to perform a speech identification process based on the current speech block, where the speech identification process includes: performing speech identification based on the current speech block to obtain a speech identification result of the current frame and a speech identification result of the future frame; determining whether a previous speech block for the current speech block exists, where a current frame of the previous speech block is before and adjacent to the current frame of the current speech block; in a case that the previous speech block for the current speech block exists, updating a target identification result based on the speech identification result of the current frame of the current speech block, where the target identification result includes a speech identification result of a future frame of the previous speech block; and outputting the speech identification result of the future frame of the current speech block.

According to one or more embodiments of the present disclosure, the speech identification process further includes: determining whether a shift speech block for the current speech block is received, where the shift speech block is obtained by shifting the current speech block forward by a target frame number, and the target frame number is an integral multiple of the number of the future frame in the current speech block; in a case that the shift speech block for the current speech block is received, performing speech identification based on the shift speech block to obtain a speech identification result of a target frame in the shift speech block, where the target frame of the shift speech block is located at an end of the shift speech block and the number of the target frame is equal to the number of the future frame of the current speech block; and outputting the speech identification result of the target frame in the shift speech block.

According to one or more embodiments of the present disclosure, the target identification result further includes a speech identification result of a target frame in a shift speech block for the previous speech block.

According to one or more embodiments of the present disclosure, a maximum ratio of the target frame number to the number of the future frame is a target value, and the target value is a ratio of the number of the current frame to the number of the future frame.

According to one or more embodiments of the present disclosure, the identification unit is further configured to perform speech identification based on the current speech block to obtain the speech identification result of the current frame and the speech identification result of the future frame by: inputting the current speech block to a pre-trained speech identification model to obtain the speech identification result of the current frame and the speech identification result of the future frame; and the identification unit is further configured to perform speech identification based on the shift speech block to obtain the speech identification result of the target frame in the shift speech block by: inputting the shift speech block to the speech identification model to obtain the speech identification result of the target frame in the shift speech block.

According to one or more embodiments of the present disclosure, the speech identification model is obtained by performing training based on a self-attention network.

According to one or more embodiments of the present disclosure, the speech identification process further includes: determining whether a next speech block for the current speech block is received, where a current frame of the next speech block is behind and adjacent to the current frame in the current block. The apparatus may further include a feedback unit. The feedback unit is configured to, in a case that the next speech block for the current speech block is received, determine the next speech block as a current speech block and perform the speech identification process.

The units mentioned in the description of the embodiments of the present disclosure may be implemented by means of software, or otherwise by means of hardware. The described unit may be provided in a processor. For example, it may be described as: a processor includes a reception unit and an identification unit. The designation of these units does not in any case constitute a qualification of the unit itself. For example, the reception unit may also be described as "a unit for receiving a speech block to be identified as a current speech block".

The above description includes merely preferred embodiments of the present disclosure and explanations of technical principles used. Those skilled in the art should understand that the scope of the present disclosure is not limited to technical solutions formed by a specific combination of the above technical features, but covers other technical solutions formed by any combination of the above technical features or equivalent features thereof without departing from the concept of the present disclosure. For example, a technical solution formed by interchanging the above features with technical features having similar functions as disclosed (but not limited thereto) is also covered in the scope of the present disclosure.

What is claimed is:

1. A speech processing method executed by one or more processors, comprising:
  receiving a speech block to be identified as a current speech block, wherein the speech block comprises a past frame, a current frame and a future frame;
  performing a speech identification process based on the current speech block, wherein the speech identification process comprises:
    performing speech identification based on the current speech block to obtain a speech identification result of the current frame and a speech identification result of the future frame;
    determining whether a previous speech block for the current speech block exists, wherein a current frame of the previous speech block is before and adjacent to the current frame of the current speech block;
    in a case that the previous speech block for the current speech block exists, updating a target identification result based on the speech identification result of the current frame of the current speech block, wherein the target identification result comprises a speech identification result of a future frame of the previous speech block; and
    outputting the speech identification result of the future frame of the current speech block to a terminal device,
  wherein the speech identification process further comprises performing speech identification based on a shift speech block to obtain a speech identification result of a target frame in the shift speech block, and
  wherein the shift speech block is obtained by shifting the current speech block forward by a target frame number, the target frame number is an integral multiple of the number of the future frame in the current speech block, the target frame number is the total number of future frames included in a speech block, and the target frame is the future frame of the shift speech block.

2. The method according to claim 1, wherein performing the speech identification based on the shift speech block to obtain the speech identification result of the target frame in the shift speech block comprises:
  determining whether a shift speech block for the current speech block is received;
  in a case that the shift speech block for the current speech block is received, performing speech identification based on the shift speech block to obtain the speech identification result of the target frame in the shift speech block, wherein the target frame of the shift speech block is located at an end of the shift speech block and the number of the target frame is equal to the number of the future frame of the current speech block; and
  outputting the speech identification result of the target frame in the shift speech block.

3. The method according to claim 2, wherein the target identification result further comprises a speech identification result of a target frame in a shift speech block for the previous speech block.

4. The method according to claim 2, wherein a maximum ratio of the target frame number to the number of the future frame in the current speech block is a target value, and the target value is a ratio of the number of the current frame of the current speech block to the number of the future frame of the current speech block.

5. The method according to claim 2, wherein
  the performing speech identification based on the current speech block to obtain a speech identification result of the current frame and a speech identification result of the future frame comprises: inputting the current speech block to a pre-trained speech identification model to obtain the speech identification result of the current frame and the speech identification result of the future frame; and
  the performing speech identification based on the shift speech block to obtain a speech identification result of a target frame in the shift speech block comprises: inputting the shift speech block to the speech identification model to obtain the speech identification result of the target frame in the shift speech block.

6. The method according to claim 5, wherein the speech identification model is obtained by performing training based on a self-attention network.

7. The method according to claim 1, wherein
  the speech identification process further comprises:
    determining whether a next speech block for the current speech block is received, wherein a current frame of the next speech block is behind and adjacent to the current frame in the current block; and
  the method further comprises:
    in a case that the next speech block for the current speech block is received, determining the next speech block as a current speech block, and performing the speech identification process.

8. A speech processing apparatus, comprising:
  at least one processor, and
  at least one memory communicatively coupled to the at least one processor and storing instructions that upon execution by the at least one processor cause the apparatus to:
  receive a speech block to be identified as a current speech block, wherein the speech block comprises a past frame, a current frame and a future frame; and
  to perform a speech identification process based on the current speech block, wherein the speech identification process comprises:
    performing speech identification based on the current speech block to obtain a speech identification result of the current frame and a speech identification result of the future frame;
    determining whether a previous speech block for the current speech block exists, wherein a current frame of the previous speech block is before and adjacent to the current frame of the current speech block;
    in a case that the previous speech block for the current speech block exists, updating a target identification result based on the speech identification result of the current frame of the current speech block, wherein the target identification result comprises a speech identification result of a future frame of the previous speech block; and outputting the speech identification result of the future frame of the current speech block to a terminal device, wherein the speech identification process further comprises performing speech identification based on a shift speech block to obtain a speech identification result of a target frame in the shift speech block, and wherein the shift speech block is obtained by shifting the current speech block forward by a target frame number, the target frame number is an integral multiple of the number of the future frame in the current speech block, the target frame number is the total number of future frames included in a speech block, and the target frame is the future frame of the shift speech block.

9. A computer-readable non-transitory medium, bearing computer-readable instructions that upon execution on a computing device cause the computing device at least to:

receive a speech block to be identified as a current speech block, wherein the speech block comprises a past frame, a current frame and a future frame;

perform a speech identification process based on the current speech block, wherein the speech identification process comprises:

performing speech identification based on the current speech block to obtain a speech identification result of the current frame and a speech identification result of the future frame;

determining whether a previous speech block for the current speech block exists, wherein a current frame of the previous speech block is before and adjacent to the current frame of the current speech block;

in a case that the previous speech block for the current speech block exists, updating a target identification result based on the speech identification result of the current frame of the current speech block, wherein the target identification result comprises a speech identification result of a future frame of the previous speech block; and outputting the speech identification result of the future frame of the current speech block to a terminal device, wherein the speech identification process further comprises performing speech identification based on a shift speech block to obtain a speech identification result of a target frame in the shift speech block, and wherein the shift speech block is obtained by shifting the current speech block forward by a target frame number, the target frame number is an integral multiple of the number of the future frame in the current speech block, the target frame number is the total number of future frames included in a speech block, and the target frame is the future frame of the shift speech block.

10. The apparatus of claim 8, the at least one memory further storing instructions that upon execution by the at least one processor cause the apparatus to:

determine whether a shift speech block for the current speech block is received;

in a case that the shift speech block for the current speech block is received, perform speech identification based on the shift speech block to obtain the speech identification result of the target frame in the shift speech block, wherein the target frame of the shift speech block is located at an end of the shift speech block and the number of the target frame is equal to the number of the future frame of the current speech block; and output the speech identification result of the target frame in the shift speech block.

11. The apparatus of claim 10, wherein the target identification result further comprises a speech identification result of a target frame in a shift speech block for the previous speech block.

12. The apparatus of claim 10, wherein a maximum ratio of the target frame number to the number of the future frame in the current speech block is a target value, and the target value is a ratio of the number of the current frame of the current speech block to the number of the future frame of the current speech block.

13. The apparatus of claim 10, the at least one memory further storing instructions that upon execution by the at least one processor cause the apparatus to:

the perform speech identification based on the current speech block to obtain a speech identification result of the current frame and a speech identification result of the future frame comprises: inputting the current speech block to a pre-trained speech identification model to obtain the speech identification result of the current frame and the speech identification result of the future frame; and the perform speech identification based on the shift speech block to obtain a speech identification result of a target frame in the shift speech block comprises: inputting the shift speech block to the speech identification model to obtain the speech identification result of the target frame in the shift speech block.

14. The apparatus of claim 13, wherein the speech identification model is obtained by performing training based on a self-attention network.

15. The apparatus of claim 8, the speech identification process further comprises:

determining whether a next speech block for the current speech block is received, wherein a current frame of the next speech block is behind and adjacent to the current frame in the current block; and the at least one memory further storing instructions that upon execution by the at least one processor cause the apparatus to:

in a case that the next speech block for the current speech block is received, determine the next speech block as a current speech block, and performing the speech identification process.

16. The computer-readable non-transitory medium of claim 9, the computer-readable instructions that upon execution on a computing device further cause the computing device to:

determine whether a shift speech block for the current speech block is received;

in a case that the shift speech block for the current speech block is received, perform speech identification based on the shift speech block to obtain the speech identification result of the target frame in the shift speech block, wherein the target frame of the shift speech block is located at an end of the shift speech block and the number of the target frame is equal to the number of the future frame of the current speech block; and output the speech identification result of the target frame in the shift speech block.

17. The computer-readable non-transitory medium of claim 16, wherein the target identification result further comprises a speech identification result of a target frame in a shift speech block for the previous speech block.

18. The computer-readable non-transitory medium of claim 16, wherein a maximum ratio of the target frame number to the number of the future frame in the current speech block is a target value, and the target value is a ratio of the number of the current frame of the current speech block to the number of the future frame of the current speech block.

19. The computer-readable non-transitory medium of claim 16, the computer-readable instructions that upon execution on a computing device further cause the computing device to:

the perform speech identification based on the current speech block to obtain a speech identification result of the current frame and a speech identification result of the future frame comprises: inputting the current speech block to a pre-trained speech identification model to obtain the speech identification result of the current frame and the speech identification result of the future frame; and the perform speech identification based on the shift speech block to obtain a speech identification result of a target frame in the shift speech block comprises: inputting the shift speech block to the speech identification model to obtain the speech identification result of the target frame in the shift speech block, wherein, the speech identification model is obtained by performing training based on a self-attention network.

20. The computer-readable non-transitory medium of claim 16, the computer-readable instructions that upon execution on a computing device further cause the computing device to:

determine whether a next speech block for the current speech block is received, wherein a current frame of the next speech block is behind and adjacent to the current frame in the current block; and the at least one memory further storing instructions that upon execution by the at least one processor cause the apparatus to:

in a case that the next speech block for the current speech block is received, determine the next speech block as a current speech block, and performing the speech identification process.

* * * * *